US009162905B2

United States Patent
Li et al.

(10) Patent No.: US 9,162,905 B2
(45) Date of Patent: Oct. 20, 2015

(54) ANTI-POLLUTION ELECTROCATALYSIS COMPOSITE MEMBRANE AND MEMBRANE REACTOR

(75) Inventors: Jianxin Li, Tianjin (CN); Tonghua Wang, Tianjin (CN); Jun Ma, Tianjin (CN); Xiaoping Liang, Tianjin (CN); Yang Yang, Tianjin (CN); Hong Wang, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 363 days.

(21) Appl. No.: 13/322,474

(22) PCT Filed: Oct. 20, 2009

(86) PCT No.: PCT/CN2009/074542
§ 371 (c)(1),
(2), (4) Date: Jan. 4, 2012

(87) PCT Pub. No.: WO2010/135886
PCT Pub. Date: Dec. 2, 2010

(65) Prior Publication Data
US 2012/0090988 A1   Apr. 19, 2012

(30) Foreign Application Priority Data

May 25, 2009   (CN) .......................... 2009 1 0069013
Jun. 30, 2009   (CN) .......................... 2009 1 0069504

(51) Int. Cl.
*C02F 1/46* (2006.01)
*B01D 67/00* (2006.01)
(Continued)

(52) U.S. Cl.
CPC ............ *C02F 1/469* (2013.01); *B01D 67/0048* (2013.01); *B01D 69/145* (2013.01);
(Continued)

(58) Field of Classification Search
None
See application file for complete search history.

(56) References Cited

U.S. PATENT DOCUMENTS 6,936,348 B1 *   8/2005   Yanagase ...................... 428/432
2006/0175256 A1 *   8/2006   Masten et al. ................. 210/638
(Continued)

FOREIGN PATENT DOCUMENTS

CN   101104537   1/2008
CN   101264992   9/2008
(Continued)

OTHER PUBLICATIONS

Bowen et al, Electrically Enhanced Separation Porcesses: The Basis of In situ Intermittent Electrolytic Membrane Cleaning (IIEMC) and In situ Electrolytic Membrane Restoration (IEMR), Journal of Membrane Science, vol. 40, 1989, pp. 219-229.*
(Continued)

*Primary Examiner* — Harry D Wilkins, III
(74) *Attorney, Agent, or Firm* — Nixon & Vanderhye, P.C.

(57) ABSTRACT

The present invention relates an antifouling electrocatalytic composite membrane and a membrane reactor. The electrocatalytic composite membrane (3) consists of a substrate and a catalytic coating, wherein the substrate is selected from a conductive substrate or a nonconductive substrate coated with a conductive coating, and the substrate is a porous support having supporting, conducting and separating functions. The catalytic coating is supported or coated on the surface and in the pores of the conductive substrate or the conductive coating so as to increase the electrocatalytic activity of the substrate. The membrane reactor provides a trans-membrane pressure as the membrane separation power generated by a pump (7) and dead-end filtration or cross-flow filtration is applied, then the feed liquid permeates through the membrane from one side to the other to achieve the separation of the liquid; meanwhile, an electrocatalytic composite membrane (3) as anode and an auxiliary electrode (4) as cathode are connected to a power supply (1) separately by conducting wires (2) so that an electrolysis apparatus is formed. The electrocatalytic composite membrane (3) has a self-cleaning function and achieves the pollution-free operation during the membrane separation.

14 Claims, 2 Drawing Sheets

(51) Int. Cl.
  *B01D 69/12* (2006.01)
  *C02F 1/467* (2006.01)
  *C02F 1/469* (2006.01)
  *B01D 69/14* (2006.01)
  *B01D 71/02* (2006.01)
  *B01J 19/24* (2006.01)
  *C02F 1/44* (2006.01)

(52) U.S. Cl.
  CPC ............ *B01D 71/021* (2013.01); *B01D 71/022* (2013.01); *B01D 71/024* (2013.01); *B01D 71/027* (2013.01); *B01J 19/2475* (2013.01); *B01D 2313/345* (2013.01); *B01D 2315/08* (2013.01); *B01D 2315/10* (2013.01); *B01D 2325/10* (2013.01); *B01J 2219/00247* (2013.01); *C02F 1/444* (2013.01); *C02F 1/4672* (2013.01); *Y02W 10/37* (2015.05)

(56) References Cited

U.S. PATENT DOCUMENTS

2009/0001009 A1* 1/2009 Linder et al. ................. 210/243
2009/0134008 A1* 5/2009 White et al. ............. 204/157.42

FOREIGN PATENT DOCUMENTS

CN 101306853 11/2008
FR 2251351 A1 * 7/1975
RU 2349373 3/2009
WO WO 2008/015142 2/2008

OTHER PUBLICATIONS

Kim et al, Material and Organic Destruction Characteristics of High Temperature-Sintered RuO2 and IrO2 Electrodes, Jounral of the Electrochemical Society, vol. 149, No. 12, 2002, pp. D187-D192.*
Maluleke et al, Partial electrochemical oxidation of phenol on ceramic-based flat sheep type electromembrane reactors, Separation and Purification Technology, vol. 32, No. 1-3, Jul. 2003, pp. 377-385.*
Machine translation of CN 101306853.*
Machine translation of CN 101104537.*
International Preliminary Report on Patentability for PCT/CN2009/074542, completed Aug. 23, 2011.
English translation of CN 101104537 A (9 pages).
English translation of CN 101306853 B (6 pages).
Verification of Translation for CN 101104537 A dated Dec. 11, 2014 (1 page).
Verification of Translation for CN 101306853 B dated Dec. 11, 2014 (1 page).

* cited by examiner

ANTI-POLLUTION ELECTROCATALYSIS COMPOSITE MEMBRANE AND MEMBRANE REACTOR

This application is the U.S. national phase of International Application No. PCT/CN2009/074542 filed 20 Oct. 2009 which designated the U.S. and claims priority to CN 200910069013.3 filed 25 May 2009 and CN 200910069504.8 filed 30 Jun. 2009, the entire contents of each of which are hereby incorporated by reference.

TECHNICAL FIELD

The present invention relates to membrane material technique, in particular to an antifouling electrocatalytic composite membrane and a membrane reactor.

BACKGROUND

As a high efficiency and environmental friendly separation technique, the membrane separation technology becomes a key technique to solve a series of fundamental problems such as energy, resource and environment problems. During the wastewater treatment with membrane, however, fouling deposited on the membrane surface and in the pores may result in an increased trans-membrane pressure, a reduced membrane flux (separation efficiency) and a quick reduction of membrane treatment ability. Thus the life time of the membrane is shortened and the reliability and economy are badly affected during the membrane separation. Obviously, membrane fouling has become a bottleneck to limit wide application of membrane separation technique. Therefore, it has become key points to control membrane fouling and to increase the antifouling ability of the membrane when membrane is used in the wastewater treatment.

Recently, in order to prevent membrane fouling, a membrane reactor has been developed to achieve multi-functionality and high efficiency of membrane by combining membrane technique and other techniques. Chinese patent application (publication No.: CN101224938A) disclosed a method for restricting the membrane fouling through a photocatalytic oxidation by using nano-materials, in which photocatalytic reactor and membrane bioreactor were combined to treat wastewater. Compared with traditional membrane bioreactor, the membrane flux was increased up to 50%. US patent application (publication No.: US2008237145A) disclosed a water treating method by photocatalytic process and an apparatus therewith, wherein titanium dioxide catalytic particles were loaded in a reactor with tubular membranes so that waster water was treated by combining photocatalytic and membrane separation techniques. The combination of photocatalytic technique improved the antifouling property and separation efficiency of the membrane. But this technique has disadvantages that solar energy was used with a low efficiency and the suspended catalyst is difficult to recover.

US patent application (publication No.: U.S. Pat. No. 6,027,649A) disclosed a membrane reactor constructed with coagulant and microfiltration membrane, which previously absorbs the organic matter in the wastewater with coagulant so as to reduce the membrane fouling. However, there are still the problems of second fouling and additive recovering for the addition of coagulant. Chinese patent application (publication No.: CN101234817A) disclosed a membrane carrier foamless oxygen supply membrane bioreactor, in which organic wastewater was treated by aeration and biofilm decomposing organic compound. US patent application (publication No.: US2004079701A) disclosed a membrane bioreactor for wastewater treatment, wherein a filtration module was immersed into mixed liquor with microorganism and porous carrier and the pollution of membrane module was restricted by the reaction between the addition and organic matter. The membrane bioreactor has a compact structure and can be easily controlled automatically, but there are still problems that the microorganism is difficult to control and bio-pollution is serious.

Chinese patent application (publication No.: CN101104537A) disclosed a water treatment device with an electrocatalysis separation membrane, in which oxidant was produced by nano-polymer material in the external electric field, thus the organic matter in the wastewater can be oxidized so as to achieve the purification of water. This device achieves a combination of degradation of organic matter, purification and disinfection. However, anode used in this device is metal material such as stainless steel and copper, which makes anode easily dissolved and results in secondary fouling and poor operation stability. In addition, the composite of polymeric conductive layer and metal substrate is unstable too.

SUMMARY OF THE INVENTION

In one aspect, the present invention relates to an antifouling electrocatalytic composite membrane and a membrane reactor, thus to improve the antifouling property of the known membrane separation material.

An antifouling electrocatalytic composite membrane, which is characterized in that the electrocatalytic composite membrane consisted of a substrate and a catalytic coating, wherein the substrate is selected from a conductive substrate or a nonconductive substrate coated with a conductive coating, and is a porous support having supporting, conducting and separating functions, the catalytic coating is supported or coated on the surface and in the pores of the conductive substrate or the conductive coating so as to increase the electrocatalytic activity of the substrate; wherein the conductive substrate is carbon membrane, the conductive coating is carbon layer, the nonconductive substrate is ceramic membrane and the catalytic coating is one selected from diamond, graphite, silica, $Sb_2O_3$, $SnO_2$, transition metal, rare metal, transition metal oxide and rare metal oxide, or a mixture thereof; the ceramic membrane material is preferably at least one selected from alumina, titanium oxide or zirconia.

The substrate and catalytic coating of the electrocatalytic composite membrane are integrated through the chemical bonding formed between them by surface modification technique so as to ensure the stability of the electrocatalytic composite membrane.

In a preferable embodiment, the electrocatalytic composite membrane has a mean pore size of 0.01 to 10 μm.

In another preferable embodiment, the transition metal may be at least one of Pt, Au, Pd, Ti, Ta, Ru, Ir, Lr and Mo.

In another preferable embodiment, the rare metal may be at least one of La and Ce.

In another preferable embodiment, the transition metal oxide may be at least one of $TiO_2$, $RuO_2$, $IrO_2$ and $Ta_2O_5$.

In another preferable embodiment, the rare metal oxide may be at least one of $CeO_2$ and $La_2O_3$.

A membrane reactor comprising the said antifouling electrocatalytic composite membrane, which is characterized in that the membrane reactor integrates the electrocatalysis and membrane separation functions, wherein the membrane reactor is designed as follows: dead-end filtration or cross-flow filtration is applied, and the feed liquid permeates through the membrane from one side to the other by a trans-membrane pressure as membrane separation power generated by a pump so that the separation of the liquid is achieved; meanwhile, the electrocatalytic composite membrane as anode and an auxiliary electrode as cathode are connected to a direct current regulated power supply separately by conducting wires so that an electrolysis apparatus is formed to degrade the pollutant attached on the surface and in the pores by electrocatalytic oxidation, thus improving the antifouling ability of the membrane and achieving the pollution-free operation during the membrane separation; wherein the anode-cathode distance in the electrolysis apparatus is from 10 to 100 mm.

In another preferable embodiment, the auxiliary electrode is a tubular or plate manner, which has a net- or pore-structure, wherein the material of the auxiliary electrode is at least one of carbon, graphite, platinum, gold, tantalum, nickel, aluminum, chromium-copper, chromium-zirconium-copper and copper-tungsten.

In another preferable embodiment, the direct current regulated power supply provides 0-30V of supply voltage and 0-10 A of current.

Compared with prior art, the present electrocatalytic composite membrane has advantages as follows:

(1) the composite membrane may combine the electrocatalytic oxidation technique with membrane separation technique, in which an electronic emitting area may be formed on the membrane surface under the electric field, thus the produced micro-gas/liquid flows may reduce the deposition of the membrane fouling; meanwhile, the strong oxidant generated in the electrocatalysis process, such as hydroxyl free radical, etc., may efficiently decompose the pollutant on the membrane surface, thus strengthening the membrane separation, giving the membrane a self-cleaning function and solving the membrane fouling; in addition, organic matters in the treated liquid may be decomposed well with a low energy exhaust and high treating efficiency, therefore, it can treat industrial wastewater such as oily wastewater, dye wastewater or paper-making wastewater.

(2) the substrate used in the present electrocatalytic composite membrane has good and stable corrosion resistance, which may prevent anode dissolving; the substrate and catalytic coating were efficiently integrated into one by surface modification technique to ensure the structural stability of the composite membrane; the coated catalytic coating is used to improve the electrocatalytic property of the substrate membrane, thus further increase the degradation efficiency of the composite membrane electrode to the organic matter in the wastewater. Membrane separation is still major during the wastewater treating, while the membrane electrode plays a positive role in oxidizing the pollutants attached on the surface and in the pores of the membrane so as to keep a high membrane flux, prolong the life time of the membrane and solve the membrane fouling in the actual application. Therefore, the present composite membrane is very suitable to the industrial application for its high separation efficiency, strong antifouling property and low energy exhaustion, and no secondary pollution exists.

Figure 1:
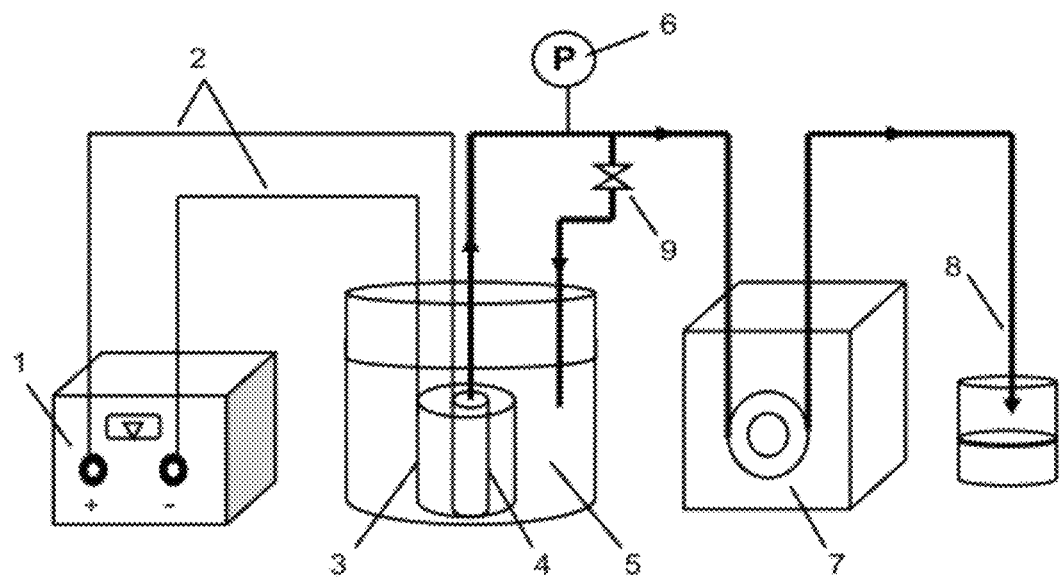
FIG. 1 is a scheme of preferable tubular electrocatalytic composite membrane reactor.

Wherein, in FIG. 1, the numeral signs means as follows respectively: 1—adjustable direct current regulated power supply; 2—conducting wire; 3—electrocatalytic composite membrane; 4—auxiliary electrode; 5—feed liquid bath; 6—pressure gauge; 7—peristaltic pump; 8—permeate outlet valve; 9—branch regulating valve;

Wherein, in FIG. 2, the numeral signs means as follows respectively: 1—adjustable direct current regulated power supply; 2—conducting wire; 3—electrocatalytic composite membrane; 4—auxiliary electrode; 5—feed liquid bath; 6—inlet pressure gauge; 7—peristaltic pump; 8—outlet pressure gauge; 9—shell; 10—permeate outlet valve; 11—feed liquid outlet valve;

EMBODIMENTS

The present electrocatalytic composite membrane was prepared by sol-gel, electrochemical deposition, magnetron sputtering or thermal decomposition approaches, wherein the sol-gel approach had the following steps:

(1) substrate pretreatment: after the substrate surface was cleaned with ethanol or acetone, it was pretreated for 10-15 h by acidic solution or aqueous alkali having oxidizability, washed by water and dried at the temperature of 100-150° C., wherein the acidic solution may be at least one of sulfuric acid solution, nitric acid solution and hydrofluoric acid solution, and the aqueous alkali may be at least one of sodium hydroxide solution, potassium hydroxide solution or hydrogen peroxide solution;

(2) sol preparation: metal precursor solution, metal oxide precursor solution, or metal and metal oxide precursor solution can be prepared as prior art. The metal precursor solution may be prepared by solving metal salt into certain of solvent. The metal oxide precursor solution may be prepared as follows: metal compound, such as ethyl orthosilicate, tetrabutyl titanate, Ce(NO)$_3$, TiO(OH)$_2$, Pb(COOH)$_2$ or SnCl$_4$; water; solvent; catalyst and additive were formulated in a molar ratio, wherein the molar ratio was determined by the kind of sol and the thickness of the coating; the solvent may be methanol, ethanol, propanol or butanol; the catalyst may be hydrochloric acid, sulfuric acid, glacial acetic acid or ammonia; the additive may be at least one of hydrolysis control agent, dispersant or dry cracking control agent. During the preparation of metal oxide precursor solution, metal precursor solution was added and stirred to get metal and metal oxide precursor solution. The above precursor solution was stirred intensively for 2-3 h to obtain sol which was aged for 24 h at room temperature for next step;

(3) coating: membrane substrate treated in step (1) was immersed into the sol obtained in step (2), and the substrate was pulled stably from the sol and dried at room temperature, wherein the substrate was immersed in the sol for 10-60 s and the pulling speed was 1-5 mm/s;

(4) sintering: the coated substrate in step (3) was sintered in muffle furnace as that it was heated to 80-200° C. at a speed of 0.5-1° C./min and kept for 0.5-1.0 h there, then to 300-500° C. at a speed of 5° C./min and kept for 0.5-1.5 h there, and then natural cooled in the furnace to get the electrocatalytic composite membrane.

The other preparation method also followed pretreating substrate, formulating coating precursor solution and coating membrane as prior art, which depends on the selected substrate and coating.

It should be noted that the electrocatalytic composite membrane and membrane reactor in the present examples are only the preferable technical solutions which may not be understood to limit the present invention. In actual application, any content corresponding to the present claims falls into the scope of the present invention.

The present invention will be illustrated in detail by combining the drawings.

Example 1

As for the electrocatalytic membrane reactor comprised of the electrocatalytic composite membrane according to the present invention, when the electrocatalytic composite membrane was a tubular membrane, the electrocatalytic membrane reactor formed therefrom was shown in FIG. 1. The electrocatalytic composite membrane 3 was putted into the feed liquid of feed liquid bath 5, wherein the electrocatalytic composite membrane 3 had a closed end and the other end thereof was connected to peristaltic pump 7 by pipelines. Peristaltic pump 7 was used to provide negative pressure continuously so that feed liquid permeates through the electrocatalytic composite membrane 3 from the outside in and flows out via permeate outlet valve 8. A branch regulating valve 9 was arranged on the line of pipes via which permeate flows through. Meanwhile, the electrocatalytic composite membrane 3 as anode and an auxiliary electrode 4 as cathode were connected to an adjustable direct current regulated power supply 1 by a conducting wire 2 separately so that an electrolysis apparatus was formed. The auxiliary electrode 4 was a tubular electrode with a net- or pore-structure, and the material of the auxiliary electrode was at least one of carbon, graphite, platinum, gold, tantalum, nickel, aluminum, chromium-copper, chromium-zirconium-copper and copper-tungsten. The adjustable direct current regulated power supply 1 provided 0-30V of supply voltage and 0-10 A of current. The anode-cathode distance in the electrolysis apparatus was from 10 to 100 mm.

Figure 2:
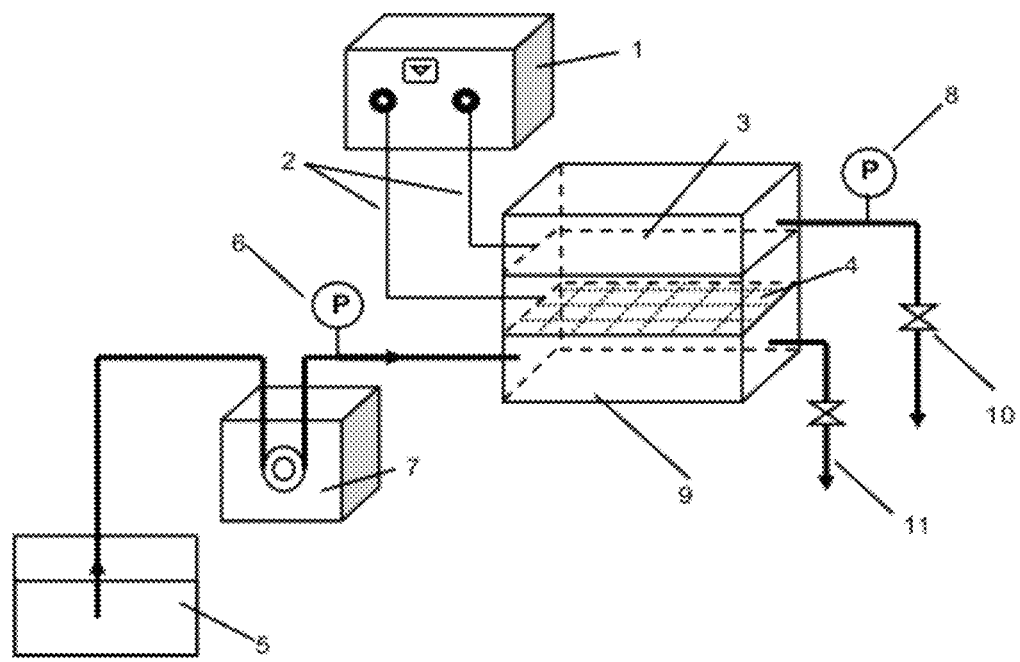
FIG. 2 is a scheme of preferable plate electrocatalytic composite membrane reactor.

As for the electrocatalytic membrane reactor comprised of the electrocatalytic composite membrane according to the present invention, when the electrocatalytic composite membrane was a plate membrane, the electrocatalytic membrane reactor formed therefrom was shown in FIG. 2. The electrocatalytic composite membrane 3 was arranged in the shell 9 and separated the shell into a feed liquid space and a permeate space. The feed liquid was conveyed into the feed liquid space in the shell 9 via feed liquid bath 5 by peristaltic pump 7, wherein a feed liquid outlet valve 11 was connected with the feed liquid space. In addition, an inlet pressure gauge 6 and an outlet pressure gauge 8 were arranged at feed liquid inlet and permeate outlet of the shell 9 respectively to adjust the transmembrane pressure, so that the pressure and flow may be controlled by adjusting the flow valve and pump speed, then the feed liquid may permeate through the membrane from the feed liquid space to the permeate space and the permeate liquid flowed out via outlet valve 10. Meanwhile, the electrocatalytic composite membrane 3 as anode and an auxiliary electrode 4 as cathode were connected to an adjustable direct current regulated power supply 1 separately by conducting wires 2 so that an electrolysis apparatus was formed. The auxiliary electrode 4 was a plate electrode, which was arranged in the feed liquid space or permeate space of the shell and had a net- or pore-structure, and the material of the auxiliary electrode was at least one of carbon, graphite, platinum, gold, tantalum, nickel, aluminum, chromium-copper, chromium-zirconium-copper and copper-tungsten. The adjustable direct current regulated power supply 1 provided 0-30V of supply voltage and 0-10 A of current. The anode-cathode distance in the electrolysis apparatus was from 10 to 100 mm.

Example 2

The electrocatalytic composite membrane in this example consisted of tubular carbon membrane substrate and metal-silica coating.

Substrate: carbon membrane (average pore size 0.6 μm; tubular size Φ8.8 mm×1.4 mm, which meant outer diameter and thickness of the tube, and tubular sizes in the following examples had the same meaning.)

Catalytic coating: $Pt/SiO_2$

Preparation: sol-gel approach

The above electrocatalytic composite membrane was prepared as follows:

(1) substrate pretreatment: a carbon membrane was ultrasonic cleaned for 30 min in ethanol solution, then pretreated for 10 h by hydrogen peroxide solution with a mass percent 20%, and then washed with water and dried at 120° C. in an oven;

(2) preparation of $Pt/SiO_2$ sol: ethyl orthosilicate, absolute ethyl alcohol, distilled water and acetylacetone (hydrolysis inhibitor) were mixed uniformly in a molar ratio 1:20:1.5:0.8, then hydrochloric acid was added therein to adjust pH around 2 and the mixture was strongly stirred for 2 h in a 40° C. water bath. 1 mL water, 10 mL absolute ethyl alcohol and 2 mL acetylacetone were taken by pipette and mixed with 0.1 g $H_2PtCl_6$. The mixture was stirred till a uniform solution was obtained, then the solution was dropped into the above solution containing Si under strongly stirring, and the stirring was continued for 30 min to get $Pt/SiO_2$ sol which was aged for 24 h at room temperature for next step;

(3) preparation of composite carbon membrane: the carbon membrane substrate was immersed in $Pt/SiO_2$ sol, then stably pulled from the sol at a speed of 5 mm/s after it was settled for 1 min and dried at room temperature. The detailed parameters of stewing and pulling depended on the sol property and coating thickness;

(4) sintering: the coated substrate obtained in step (3) was placed in a muffle furnace for post heat treatment as follows: the substrate was heated to 200° C. at a speed of 0.5° C./min and there kept for 0.5 h, then heated to predetermined heat treatment temperature 500° C. at a speed of 5° C./min and there kept for 0.5 h, and then cooled naturally in the furnace, thus to obtain the electrocatalytic composite carbon membrane coated $Pt/SiO_2$.

The composite carbon membrane had an average pore size of 0.52 μm and an initial water flux of 220 L/m² hbar.

The composite carbon membrane in this example as anode, tubular tantalum electrode as cathode and sodium sulfate solution as electrolyte were used to form the membrane reactor in FIG. 1, and the other operating conditions were shown in the following table:

| Voltage | Current | Anode-cathode distance | Trans-membrane pressure | Analogue wastewater |
|---|---|---|---|---|
| 3 V | 0.20-0.25 A | 14 mm | 0.025 MPa | 100 mg/L oily wastewater (pH = 6, electrolyte concentration 10 g/L |

Figure 3:
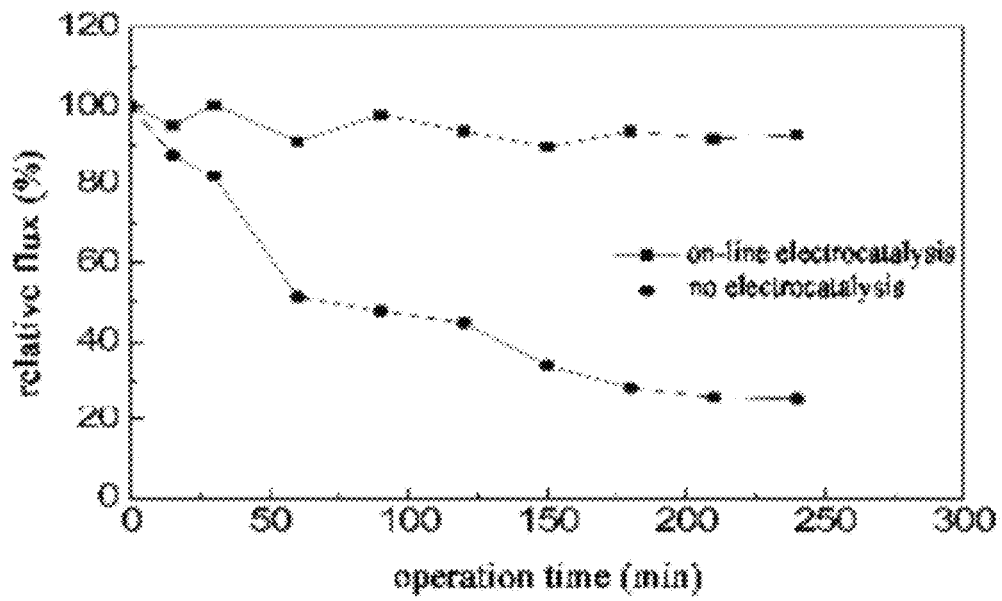
FIG. 3 is a relation graph of membrane flux and operation time, which shows the performance of composite membrane with a catalytic coating of Pt/SiO$_2$ prepared in example 2 during the treatment of 100 ppm oily wastewater with and without electrocatalysis.

When the electrocatalytic technique combined with membrane separation was used to treat wastewater, the oil removal rate of wastewater was 90%. FIG. 3 shows the relationship of membrane flux variation and operation time with and without electrocatalysis. It is illuminated from the curve that the composite membrane had a high flux while electrified, thus a self-cleaning function of the membrane was achieved and the stability of membrane separation when treating wastewater was ensured.

Example 3

The electrocatalytic composite membrane in this example consisted of tubular carbon membrane substrate and metal oxide coating.
Substrate: carbon membrane (average pore size 0.4 μm; tubular size Φ8.8 mm×1.4 mm)
Catalytic coating: $TiO_2$
Preparation: sol-gel approach
The above electrocatalytic composite membrane was prepared as follows:
(1) substrate pretreatment: the substrate pretreatment was the same as that in example 2;
(2) preparation of $TiO_2$ sol: tetrabutyl titanate, absolute ethyl alcohol, distilled water, glacial acetic acid and acetylacetone were formulated in a molar ratio 1:18:2:0.2:0.5, then the mixture was strongly stirred for 2 h and was aged for 24 h at room temperature for next step;
(3) preparation of composite carbon membrane: the carbon membrane substrate was immersed in $TiO_2$ sol, then stably pulled from the sol at a speed of 3 mm/s after it was settled for 30 s and dried at room temperature;
(4) sintering: the coated substrate obtained in step (3) was placed in muffle furnace for post heat treatment as follows: the substrate was heated to 100° C. at a speed of 1° C./min and there kept for 0.5 h, then heated to predetermined heat treatment temperature 400° C. at a speed of 5° C./min and there kept for 1 h, and then cooled naturally in the furnace, thus to obtain the electrocatalytic composite carbon membrane coated $TiO_2$.

The composite carbon membrane had an average pore size of 0.33 μm and an initial water flux of 156 $L/m^2$ hbar.

The composite carbon membrane in this example as anode, tubular nickel electrode as cathode and sodium sulfate solution as electrolyte were used to form the membrane reactor in FIG. 1, and the other operating conditions were shown in the following table:

| Voltage | Current | Anode-cathode distance | Trans-membrane pressure | Analogue wastewater |
|---|---|---|---|---|
| 4 V | 0.25-0.30 A | 20 mm | 0.050 MPa | 200 mg/L oily wastewater (pH = 6, electrolyte concentration 20 g/L |

Figure 4:
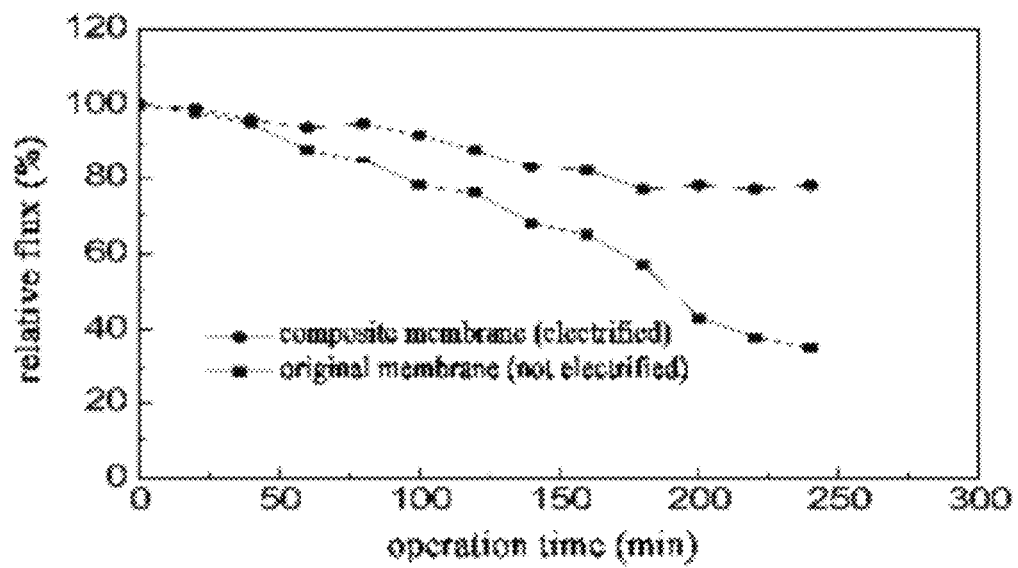
FIG. 4 is a relation graph of membrane flux and operation time when separately using the original membrane and composite membrane with a catalytic coating of TiO$_2$ prepared in example 3 to treat 200 ppm oily wastewater.

When the electrocatalytic technique combined with membrane separation was used to treat wastewater, the oil removal rate of wastewater is 92%. FIG. 4 showed the compared results of original membrane and composite membrane. The results showed that the membrane had a higher flux while electrified and the composite membrane had a higher electrocatalytic property than that of original membrane.

Example 4

The electrocatalytic composite membrane in this example consisted of plate carbon membrane substrate and metal oxide coating.
Substrate: carbon membrane (average pore size 0.8 μm; plate membrane size 50 mm×30 mm)
Catalytic coating: Pt
Preparation: electrochemical precipitation approach
The above electrocatalytic composite membrane was prepared as follows:
(1) substrate pretreatment: a carbon membrane was ultrasonic cleaned for 30 min in acetone solution, then pretreated for 12 h by a mixture of hydrofluoric acid and nitric acid in a volume ratio of 1:1, and then washed with water and dried for next step;
(2) formulation of catalyst solution: 0.8 g $H_2PtCl_6.6H_2O$, 10 g $(NH_4)_2HPO_4$ and 30 g $Na_2HPO_4$ were formulated to a 200 mL aqueous solution. Then NaOH was added therein to adjust pH to 8;
(3) preparation of composite membrane: a titanium microporous membrane was immersed into electrolysis bath for precipitation, wherein titanium membrane, titanium net and catalyst solution formulated in step (2) were used as cathode, anode and electrolyte respectively, current density is 5 $mA/cm^2$, the precipitation was lasted for 25 min and the temperature in the electrolysis bath was controlled at 80° C. Mechanical stirring was lasted during the precipitation in order to reduce concentration polarization and ensure a uniform precipitation. Thus composite carbon membrane coated platinum was obtained.

The composite carbon membrane had an average pore size of 0.68 μm and an initial water flux of 247 $L/m^2$ hbar.

The composite carbon membrane in this example as anode and plate aluminum electrode as cathode were used to construct the membrane reactor as shown in FIG. 2, and the other operating conditions were shown in the following table:

| Voltage | Current | Anode-cathode distance | Trans-membrane pressure | Industrial wastewater |
|---|---|---|---|---|
| 4 V | 0.30-0.35 A | 22 mm | 0.040 MPa | High salt dye wastewater with 20000 mg/L of COD |

When the electrocatalytic technique combined with membrane separation was used to treat dye wastewater, the COD concentration was degraded to 800 mg/L and the dye color was almost removed completely. After the composite membrane was operated for 6 h, the membrane flux was still maintained as 88% of the initial one, thus achieving a high efficient, low energy exhaustion and anti-fouling operation.

Example 5

The electrocatalytic composite membrane in this example consisted of ceramic membrane, conductive coating and catalytic coating.
Ceramic membrane: titanium oxide ceramic membrane (average pore size 0.5 μm; tubular size Φ15 mm×1.5 mm)
Conductive coating: carbon layer (liquid immersion method)
Catalytic coating: $SnO_2/Sb_2O_3$ (sol-gel approach)
The above electrocatalytic composite membrane was prepared as follows:
(1) pretreatment: titanium oxide ceramic membrane was pretreated as example 4;
(2) preparation of carbon layer: polyamic acid was formulated a solution with a concentration of 12% (wt) as a coating solution and the coating solution was coated on the pretreated titanium oxide ceramic membrane by liquid immersion method. Then the coated membrane was dried at 100° C. for 1 h, and thereafter carbonized in carbide furnace at a final temperature of 700° C. for 2.5 h under nitrogen;
(3) preparation of catalytic coating $SnO_2/Sb_2O_3$: a certain amount of $SnCl_4.5H_2O$ crystal was dissolved in a de-ionized water to form a solution (0.15 mol/L), certain $SbCl_3$ was weighed so as to ensure the atom ratio of Sn to Sb being as 5% and dissolved in ethanol. Citric acid was added into $SnCl_4$ solution under stirring till pH was 2.0, then $SbCl_3$ solution was added therein slowly. The mixture was stirred and heated to 50° C., then aqueous ammonia (0.3 mol/L) was added therein till a cream yellow precipitate mixture of $Sn(OH)_4$ and $Sb(OH)_3$ was obtained. Then fully stirring, centrifugation and washing were performed to obtain the precipitate. The precipitate was reheated to 50° C. with stirring and re-dissolved in oxalic acid, then polyethylene glycol was added therein in a volume ratio of 10% thereof with 2 h stirring and ethanol was added therein in a volume ratio of 10% thereof. The mixture was concentrated, cooled with stirring to room temperature and aged for 24 h;
(4) coating and sintering: the titanium oxide ceramic membrane in step (2) was immersed in the solution in step (3), then stably pulled out after it was settled for 2 min and dried at room temperature. The obtained sample was put in muffle furnace for post heat treatment as following process: the sample was heated to 150° C. at a speed of 1° C./min and there kept for 0.5 h, then heated to predetermined heat treatment temperature 600° C. at a speed of 5° C./min and there kept for 1 h, and then cooled naturally in the furnace, thus the electrocatalytic composite $SnO_2/Sb_2O_3$ ceramic membrane was obtained.

The composite membrane had an average pore size of 0.35 mm and an initial water flux of 150 L/m² hbar.

The electrocatalytic composite membrane in this example as anode, tubular copper-tungsten electrode as cathode and sodium sulfate solution as electrolyte were used to form the electrocatalytic membrane reactor in FIG. 1, and the other operating conditions were shown in the following table:

| Voltage | Current | Anode-cathode distance | Trans-membrane pressure | Analogue wastewater |
|---|---|---|---|---|
| 4 V | 0.55-0.60 A | 20 mm | 0.025 MPa | 500 mg/L oily wastewater (pH = 7, electrolyte concentration 30 g/L) |

When the electrocatalytic technique combined with membrane separation was used to treat wastewater under a condition that the membrane was electrified in the post stage while not in the early stage, the results showed that, as compared with the initial one, the membrane flux decreased to 50% when the membrane was not electrified in the early 120 min, but it recovered to 88% after the membrane was electrified for 300 min in the post state, and the oil removal rate of the wastewater was up to 91%.

The results further verified that the combination of electrocatalysis made the problem of membrane fouling solved efficiently.

What is claimed is:

1. An antifouling electrocatalytic composite membrane, wherein the electrocatalytic composite membrane consists of a substrate and a catalytic coating, wherein the substrate is selected from a conductive substrate or a nonconductive substrate coated with a conductive coating, the substrate is a porous support having supporting, conducting and separating functions, and the catalytic coating is supported or coated on the surface and in the pores of the conductive substrate or the conductive coating so as to increase the electrocatalytic activity of the substrate; wherein the conductive substrate is carbon membrane, the conductive coating is carbon layer, the nonconductive substrate is ceramic membrane and the catalytic coating is one selected from diamond, graphite, $Sb_2O_3$, $SnO_2$, transition metal, rare metal, transition metal oxide and rare metal oxide, or a mixture thereof, and the carbon layer and catalytic coating are separately formed;
wherein:
the substrate and catalytic coating of the electrocatalytic composite membrane are integrated through chemical bonding formed between them by surface modification technique so as to ensure the stability of the electrocatalytic composite membrane, and
the surface modification is performed by pretreating the surface with a nitric acid solution for 10 to 15 hours.

2. The antifouling electrocatalytic composite membrane according to claim 1, wherein the electrocatalytic composite membrane has an average pore size of 0.01 to 10 μm.

3. The antifouling electrocatalytic composite membrane according to claim 1, characterized in that the transition metal is at least one of Pt, Au, Pd, Ti, Ta, Ru, Ir and Mo.

4. The antifouling electrocatalytic composite membrane according to claim 1, wherein the rare metal is at least one of La and Ce.

5. The antifouling electrocatalytic composite membrane according to claim 1, wherein the transition metal oxide is at least one of $TiO_2$, $RuO_2$, $IrO_2$ and $Ta_2O_5$.

6. The antifouling electrocatalytic composite membrane according to claim 5, wherein the rare metal oxide is at least one of $CeO_2$ and $La_2O_3$.

7. A membrane reactor comprising the antifouling electrocatalytic composite membrane according to claim 1, wherein the membrane reactor integrates the electrocatalysis and membrane separation functions, wherein the membrane reactor is designed as follows: dead-end filtration or cross-flow filtration is applied, and the feed liquid permeates through the membrane from one side to the other by a trans-membrane pressure as membrane separation power generated by a pump to separate the liquid; meanwhile, the electrocatalytic composite membrane as anode and an auxiliary electrode as cathode are connected to a direct current regulated power supply separately by conducting wires so that an electrolysis apparatus is formed to degrade the pollutant attached on the surface and in the pores of the membrane by electrocatalytic oxidation, thus improving the antifouling ability of the membrane and achieving the pollution-free operation during the membrane separation; wherein the anode-cathode distance in the electrolysis apparatus is from 10 to 100 mm.

8. The membrane reactor according to claim 7, wherein the auxiliary electrode is a tubular or plate electrode having a net- or pore-structure, wherein the material of the auxiliary electrode is at least one of carbon, graphite, platinum, gold, tantalum, nickel, aluminum, chromium-copper, chromium-zirconium-copper and copper-tungsten.

9. The membrane reactor according to claim 7, wherein the direct current regulated power supply provides 0-30V of supply voltage and 0-10 A of current.

10. An antifouling electrocatalytic composite membrane, comprising:
a substrate; and
a catalytic coating;
wherein:
the substrate comprises a nonconductive ceramic membrane with a conductive coating comprising a carbon layer or the substrate comprises a conductive carbon membrane with no coating;

the catalytic coating comprises diamond, graphite, $Sb_2O_3$, $SnO_2$, a transition metal, a rare metal, or a mixture thereof;

the substrate is a porous support configured to provide supporting, conducting, and separating functions during use;

the catalytic coating is chemically bonded and integrated onto the substrate and into pores of the substrate to create a composite membrane using surface modification, wherein the surface modification is performed by pretreating the surface with nitric acid solution for 10 to 15 hours; and the antifouling composite membrane is configured to function as a membrane reactor which simultaneously performs electrocatalysis and membrane separation functions when a direct current is applied to the composite membrane.

11. The antifouling electrocatalytic composite membrane of claim 10, wherein the composite membrane has a closed first end and a second end configured to be connected to a peristaltic pump during use.

12. A method for preventing or removing fouling of a membrane used for wastewater treatment, comprising:

chemically bonding a substrate with a catalytic coating using surface modification to form an antifouling electrocatalytic composite membrane, wherein the surface modification is performed by pretreating the surface with a nitric acid solution for 10 to 15 hours;

applying dead-end filtration or cross-flow filtration;

connecting the electrocatalytic composite membrane to a direct current regulated power supply as an anode;

separately connecting an auxiliary electrode to the direct current regulated power supply as a cathode; and using the antifouling electrocatalytic composite membrane simultaneously for electrocatalysis and membrane separation functions, wherein:

the substrate comprises a nonconductive ceramic membrane with a conductive coating comprising a carbon layer or the substrate comprises a conductive carbon membrane with no coating.

13. The method of claim 12, further comprising:

providing the composite membrane with a first closed end;

placing the composite membrane in a liquid feed bath; and providing the composite membrane with a second end connected to a peristaltic pump.

14. The method of claim 13, further comprising using the peristaltic pump to provide negative pressure continuously so that a feed liquid found in the liquid feed bath permeates through the composite membrane from an outside inward and flows out via a permeate outlet valve.

* * * * *